(12) United States Patent
Totori

(10) Patent No.: US 10,714,284 B2
(45) Date of Patent: Jul. 14, 2020

(54) DIAL APPARATUS AND IMAGING APPARATUS

(71) Applicant: CANON KABUSHIKI KAISHA, Tokyo (JP)

(72) Inventor: Yuki Totori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/198,029

(22) Filed: Nov. 21, 2018

(65) Prior Publication Data

US 2019/0164706 A1    May 30, 2019

(30) Foreign Application Priority Data

Nov. 29, 2017 (JP) ................................ 2017-229061

(51) Int. Cl.

| H01H 19/58 | (2006.01) |
|---|---|
| H01H 19/08 | (2006.01) |
| H01H 19/14 | (2006.01) |
| H01H 19/11 | (2006.01) |
| H04N 5/232 | (2006.01) |
| H04N 5/225 | (2006.01) |

(52) U.S. Cl.
CPC .......... *H01H 19/585* (2013.01); *H01H 19/08* (2013.01); *H01H 19/14* (2013.01); *H01H 19/11* (2013.01); *H01H 2019/143* (2013.01); *H01H 2203/018* (2013.01); *H01H 2239/03* (2013.01); *H04N 5/2251* (2013.01); *H04N 5/23245* (2013.01)

(58) Field of Classification Search
CPC ...... H01H 19/585; H01H 19/14; H01H 19/08; H01H 2019/143; H01H 2239/03; H01H 2203/018; H01H 19/11; H04N 5/2251; H04N 5/23245

USPC ....................... 200/11 R, 336, 564, 570, 571
See application file for complete search history.

(56) References Cited

U.S. PATENT DOCUMENTS

| 4,399,335 A * | 8/1983 | House ................... H01H 67/22 200/11 R |
|---|---|---|
| 4,755,646 A * | 7/1988 | Fowler ................. H05B 6/6452 200/37 A |
| 2018/0278842 A1* | 9/2018 | Mabuchi ............ H04N 5/23245 |

FOREIGN PATENT DOCUMENTS

| JP | 2002-298699 A | 10/2002 |
|---|---|---|
| JP | 2006-250566 A | 9/2006 |

* cited by examiner

*Primary Examiner* — Edwin A. Leon
*Assistant Examiner* — Lheiren Mae A Caroc
(74) *Attorney, Agent, or Firm* — Cowan, Liebowitz & Latman, P.C.

(57) ABSTRACT

A dial apparatus includes an operation member to be rotatably operated, a contact member including a plurality of contact portions and configured to rotate as the operation member rotates, and a substrate having a signal pattern provided on a plurality of concentric circles with a center at a rotation center of the operation member. The dial apparatus outputs a binary code when the plurality of contact portions contact the signal pattern as the operation member rotates. The signal pattern includes a reference signal area connected to a reference potential, a first signal area configured to output a first signal, and a second signal area configured to output a second signal. Two of the plurality of contact portions are provided on a predetermined concentric circle in the signal pattern and contact a signal pattern that includes the reference signal area and the first signal area.

7 Claims, 5 Drawing Sheets

| IMAGING MODE | SIGNAL 1 | SIGNAL 2 | SIGNAL 3 |
|---|---|---|---|
| P1 | 0 | 0 | 1 |
| P2 | 0 | 1 | 1 |
| P3 | 0 | 1 | 0 |
| P4 | 1 | 1 | 0 |
| P5 | 1 | 1 | 1 |
| P6 | 1 | 0 | 1 |
| P7 | 1 | 0 | 0 |
| P8 | 0 | 0 | 0 |

FIG. 7

DIAL APPARATUS AND IMAGING APPARATUS

BACKGROUND OF THE INVENTION

Field of the Invention

The present invention relates to a dial apparatus and an imaging apparatus, in which a phase armature slides on a conductive pattern formed on a printed circuit board and detects a rotation according to the electrified state between the phase armature and the conductive pattern.

Description of the Related Art

A conventional dial apparatus provided to an electronic apparatus, such as a digital camera, a video camera, and a portable information terminal, is used for a variety of settings and operation modes. The dial apparatus includes a substrate fixed onto an apparatus body and provided with a signal pattern on a plurality of concentric circles with a center as a rotation center of the dial apparatus, a phase armature fixed to a rotatable operation member and contacting the signal pattern. The dial apparatus serves as a rotation detector that detects the rotational phase of the operating member by detecting as a binary code electrified and non-electrified states between the signal pattern and the phase armature.

The dial apparatus requires the binary code from a predetermined code to an adjacent code to always change by 1 signal (=1 bit). This is because erroneous data may be acquired in the transition of the signal depending on the mechanical accuracy of the dial apparatus and the data read timing. The binary code arrayed based on the above change is called a gray code. Since the gray code enables only one bit to always change in a change to an adjacent code, the read value of the data is always the previous or next value at any timing and an erroneous data is never generated.

The dial apparatus that uses "a" signal patterns and detects the rotational phase of the operating member by the "a"-bit gray code can theoretically generate $2^a$ codes and thus can detect $2^a$ rotational phases. For example, when three signal patterns are used and a 3-bit gray code is arranged, 8 ($=2^3$) codes (000, 001, 010, 110, 110, 111, 101, 100) can be generated. When this signal pattern is arranged on a circle, "a" laps (or circumferences) of signal patterns and "a" corresponding contact portions are required. When the "0" code is set to the electrified state to the reference potential (such as the ground potential) of the signal pattern, and the "1" code is set to the nonelectrified state, the following problems occur.

In producing a code "111" etc. with a 3-bit gray code, all three contact portions need to be in the nonelectrified state to the reference potential and any connections are proper unless all contact portions are connected to the signal pattern. However, a code "000" etc. requires all three contact portions to be connected to the signal patterns, and no connection to the reference potential is available and the code "000" cannot be made. In other words, $2^a-1$ codes can be created by the "a" laps of signal patterns and the "a" corresponding contact portions, except for the code "000 . . . 0" in which all the signal codes are 0. For example, the dial apparatus can produce maximum 7 ($=2^3-1$) gray codes based on the three laps of signal patterns and the three contact portions. Generating $2^a$ gray codes needs "a+1" laps of signal patterns and "a+1" corresponding contact portions and thus increases the size of the dial apparatus.

Japanese Patent Laid-Open No. ("JP") 2002-298699 discloses a rotary switch that detects sixteen rotational phases with four laps of signal patterns and five to seven contact portions.

JP 2006-250566 discloses a rotary switch that suppresses erroneous outputs through a determined signal terminal for outputting a determined signal, and solves a problem of the erroneous outputs at an intermediate position when the switch is changed.

However, the rotary switch in JP 2002-298699 detects "1111" next to the code "0000," and causes an incomplete gray code. Therefore, this configuration may acquire an incorrect signal code and erroneously detect the rotational phase.

Since the conductive patterns of the determined signal terminals are arranged at certain intervals or longer in the rotary switch disclosed in JP 2006-250566, the sliding abrasion may cause peels of the conductive patterns. In order to avoid the conductive patterns from peeling, an insulating sheet may be disposed at the end of the conductive pattern, but then a dial operation feeling may be deteriorated because the insulating sheet produces a step. In addition, a phase in which the conductive pattern does not contact the contact portion of the phase armature occurs and causes the phase armature to temporarily be electrically floating metal and the signal to be unstable or to fluctuate.

SUMMARY OF THE INVENTION

The present invention provides a dial apparatus and an imaging apparatus which can generate a code in which all signal codes are "0" and detect $2^a$ phases with "a" laps of signal patterns without increasing the number of signal patterns.

A dial apparatus according to one aspect of the present invention includes an operation member to be rotatably operated, a contact member including a plurality of contact portions and configured to rotate as the operation member rotates, and a substrate having a signal pattern provided on a plurality of concentric circles with a center at a rotation center of the operation member. The dial apparatus outputs a binary code when the plurality of contact portions contact the signal pattern as the operation member rotates. The signal pattern includes a reference signal area connected to a reference potential, a first signal area configured to output a first signal, and a second signal area configured to output a second signal. Two of the plurality of contact portions are provided on a predetermined concentric circle in the signal pattern and contact a signal pattern that includes the reference signal area and the first signal area.

Further features of the present invention will become apparent from the following description of exemplary embodiments with reference to the attached drawings.

BRIEF DESCRIPTION OF THE DRAWINGS

FIG. 7 is a signal code arrangement table for each imaging mode.

DESCRIPTION OF THE EMBODIMENTS

Figure 1:
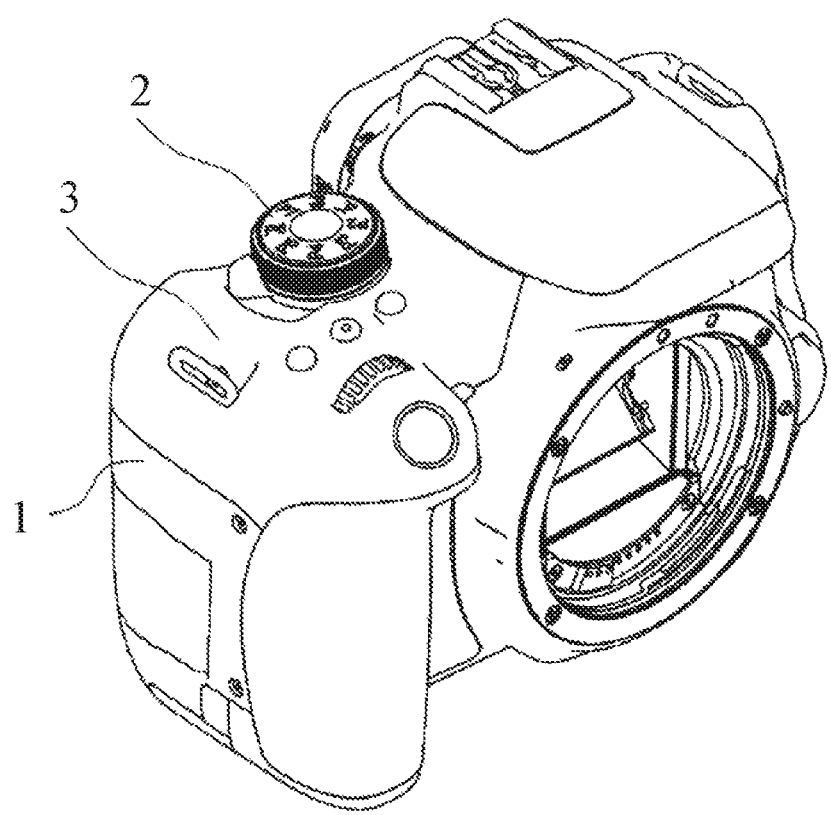
FIG. 1 is a perspective view of an electronic apparatus that includes a dial apparatus according to an embodiment of the present invention.

Referring now to the accompanying drawings, a detailed description will be given of embodiments according to the present invention. In each figure, the same reference numerals are given to the same elements, and a duplicate description thereof will be omitted.

FIG. 1 is a perspective view of a digital single-lens reflex camera (referred to as a "camera" hereinafter) 1 as an illustrative imaging apparatus mounted with a dial apparatus according to one embodiment of the present invention. A mode dial unit (dial apparatus, referred to as a "mode dial" hereinafter) 2 is arranged on an upper surface of the camera 1. This embodiment can set an imaging condition corresponding to the imaging mode by selecting the imaging mode with the mode dial 2. This embodiment can make eight imaging modes "P1" to "P8" selectable. An operation member such as the mode dial 2 is assembled to an upper cover 3. This embodiment describes the dial apparatus mounted on the imaging apparatus, but may mount the dial apparatus on another electronic apparatus for use.

Figure 2:
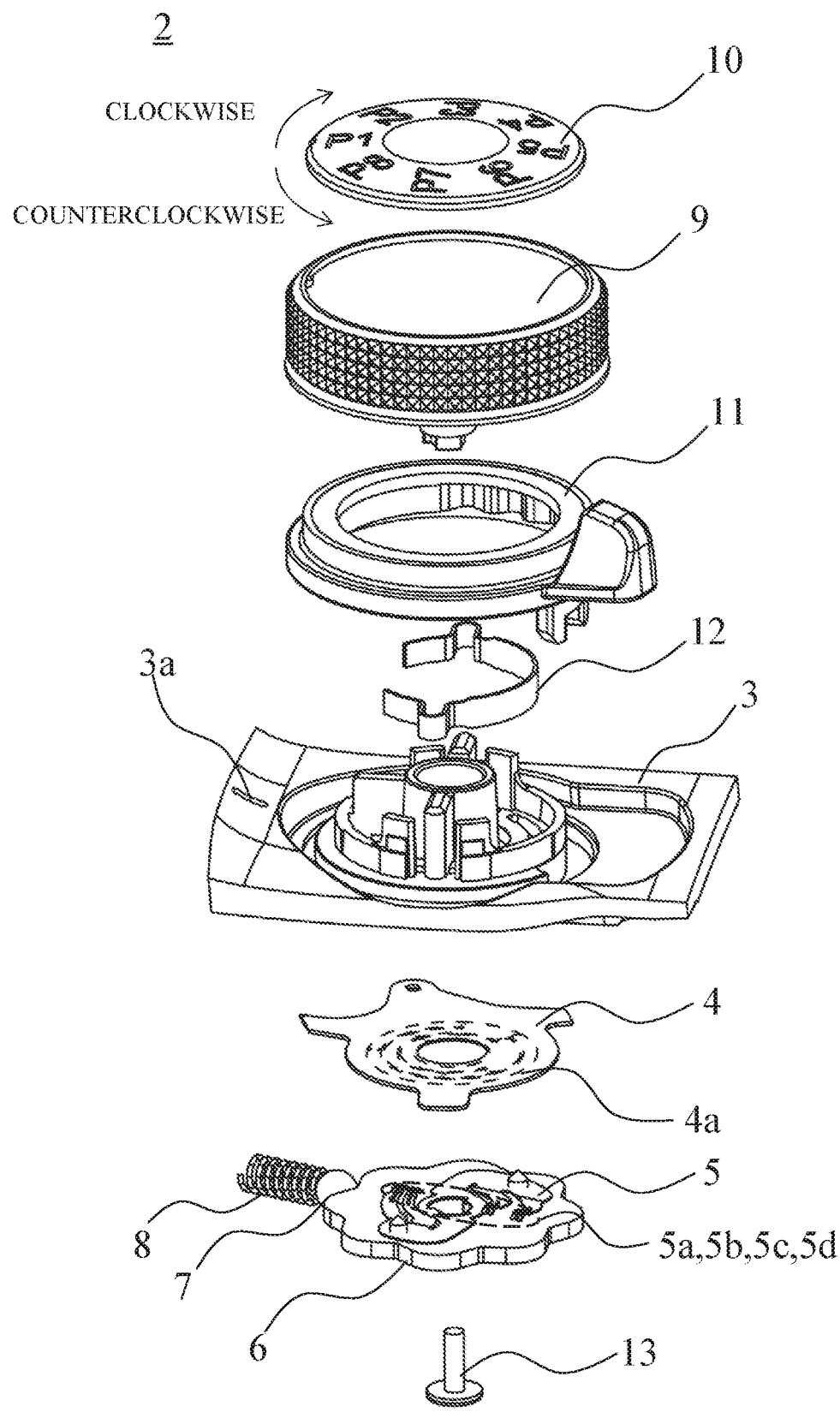
FIG. 2 is an exploded perspective view of a mode dial unit.

FIG. 2 is an exploded perspective view of the mode dial 2. FIG. 2 illustrates only part of the upper cover 3.

A flexible printed circuit board (referred to as an "FPC" hereinafter) 4 is fixed to the upper cover 3. A signal pattern 4a is provided on the lower surface side of the FPC 4. The signal pattern 4a is provided on a plurality of concentric circles with a center at the rotation center of the mode dial 2.

A phase armature (contact member) 5 is made of metal, and is integrally caulked to a click plate 6. Leaf spring-like contact portions 5a, 5b, 5c, and 5d are provided at the tip of the phase armature 5. The contact portions 5a. 5b, 5c, and 5d are forced against, are supported by, and electrically contact the signal pattern 4a.

The click plate 6 has the same number of (eight in this embodiment) protrusions and dents along the circumferential direction as the number of imaging modes that can be set by the mode dial 2. When the click ball 7 is engaged with the dent, a click feeling is generated for each rotation of 45° of the mode dial 2. A coil spring 8 urges the click ball 7 against the click plate 6.

A dial operation unit (operation member) 9 is an operation unit of the mode dial 2, and is fixed onto the upper cover 3 so that the dial mode unit 9 can rotate by 360°. The user can operate the mode dial 2 by rotating the side surface of the dial operation unit 9.

A mode dial cap 10 is adhered to the dial operation unit 9, and has the same number of (eight in this embodiment) indicators as the number of imaging modes that can be set by the mode dial 2, which are printed at intervals of 45° on the circumference.

The user can select a desired imaging mode by according the index of the mode dial cap 10 with a line indicator 3a printed on the upper cover 3. In the state of FIG. 2, the mode dial 2 selects the imaging mode "P1." The imaging mode can be selected in the order of "P2," "P3," . . . "P8" by rotating the dial operating unit 9 counterclockwise from this state, and the imaging mode can be selected in the order of "P8," "P7," . . . "P2" by rotating the dial operating unit 9 clockwise from this state.

A power lever 11 is used to power on and off the camera 1. A leaf spring 12 is engaged with a projection portion and a dent portion provided on the inner wall of the power supply lever 11, and generates a click feeling in turning on and off the power supply.

A fixing screw 13 when fastened with the dial operating portion 9, integrates the dial operating unit 9, the phase armature 5, and the click plate 6 with one another, and is rotatably fixed onto the upper cover 3.

Figure 3:
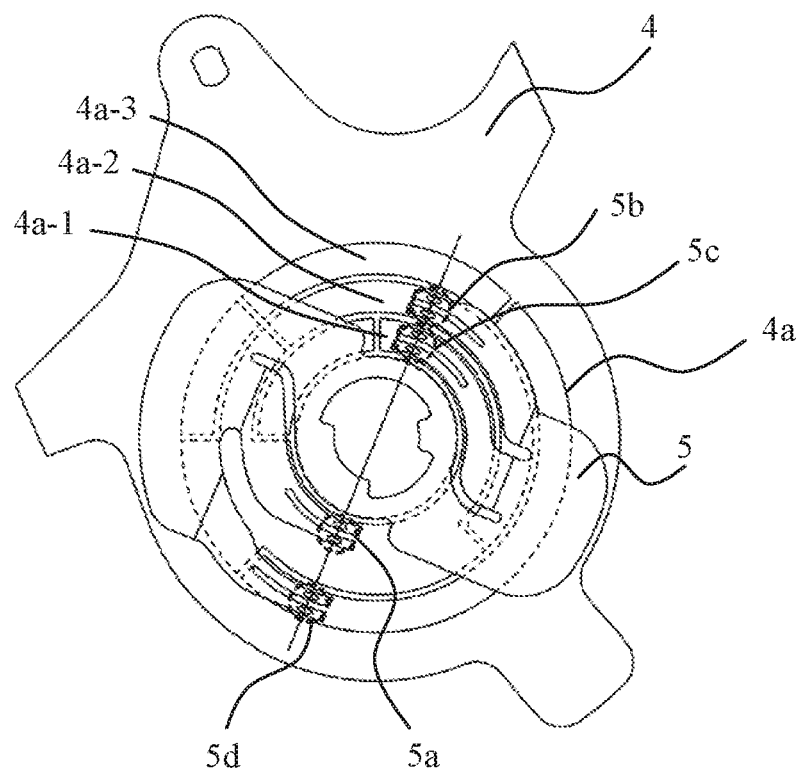
FIG. 3 is a bottom view of a flexible printed circuit board and a phase armature.

FIG. 3 is a bottom view of the FPC 4 and the phase armature 5. The signal pattern 4a of the FPC 4 contains three signal patterns 4a-1, 4a-2, and 4a-3 in order from the rotation center side of the mode dial 2. Contact portions 5a and 5b slidably contact the signal pattern 4a-1. The contact portion 5c slidably contacts the signal pattern 4a-2. The contact portion 5d slidably contacts the signal pattern 4a-3. Each contact portion does not contact a signal pattern other than the corresponding signal pattern.

The contact portions 5a and 5b are provided on the same circle centered at the rotation center of the mode dial 2. The contact portions 5a, 5b, 5c, and 5d are located on the same straight line that passes through the rotation center of the mode dial 2. It can be considered that they are located "on the same straight line" when they are located on the same straight line strictly, and when they are slightly offset from the straight line, as long as they may be located on substantially the same straight line. One or more of the contact portions 5a, 5b, 5c, and 5d are provided on both sides of the rotation center of the mode dial 2. Thus, each contact portion can approximately equalize the force in the thrust direction which the phase armature 5 applies to the FPC 4, hardly causes the degradation such as backlash, and can provide the mode dial 2 with an excellent electrical connection reliability between the FPC 4 and the phase armature 5.

Figure 4:
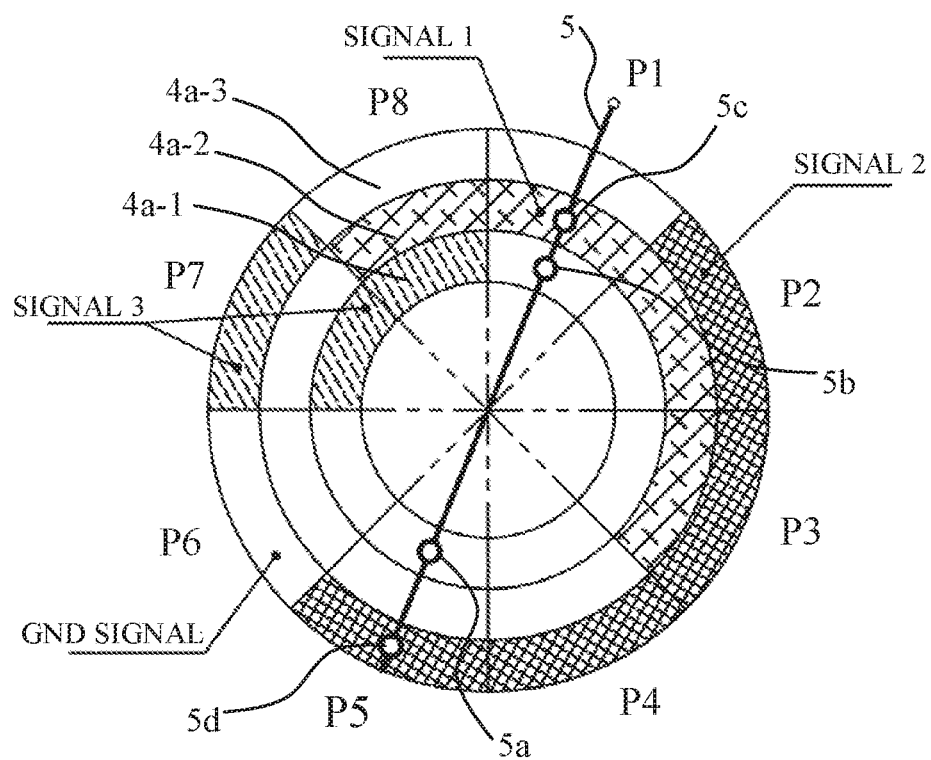
FIG. 4 is a schematic diagram of the flexible printed circuit board and the phase armature when an imaging mode P1 is selected.

FIG. 4 is a schematic diagram of the FPC 4 and the phase armature 5 when the imaging mode P1 is selected. The signal patterns 4a-1, 4a-2, and 4a-3 have signal areas connected to any one of signal 1, signal 2, signal 3 and reference potential signal (referred to as a "GND signal" hereinafter) for each phase. By selectively connecting the GND signal to or disconnecting the GND signal from the signal 1-3 via the phase contact 5, the potential of the signal 1-3 can be switched between LOW and HIGH. In the state illustrated in FIG. 4, the contact portions 5a and 5b are connected to the signal area (reference signal area) of the GND signal, the contact unit 5c is connected to the signal area of the signal 1, and the contact unit 5d is connected to the signal area of the signal 2. Thereby, the potentials of the signals 1 and 2 are LOW, and the potential of the signal 3 is HIGH. Hence, if it is assumed that HIGH is set to 1 and LOW is set to 0, a binary code "001" is generated.

Figure 5:
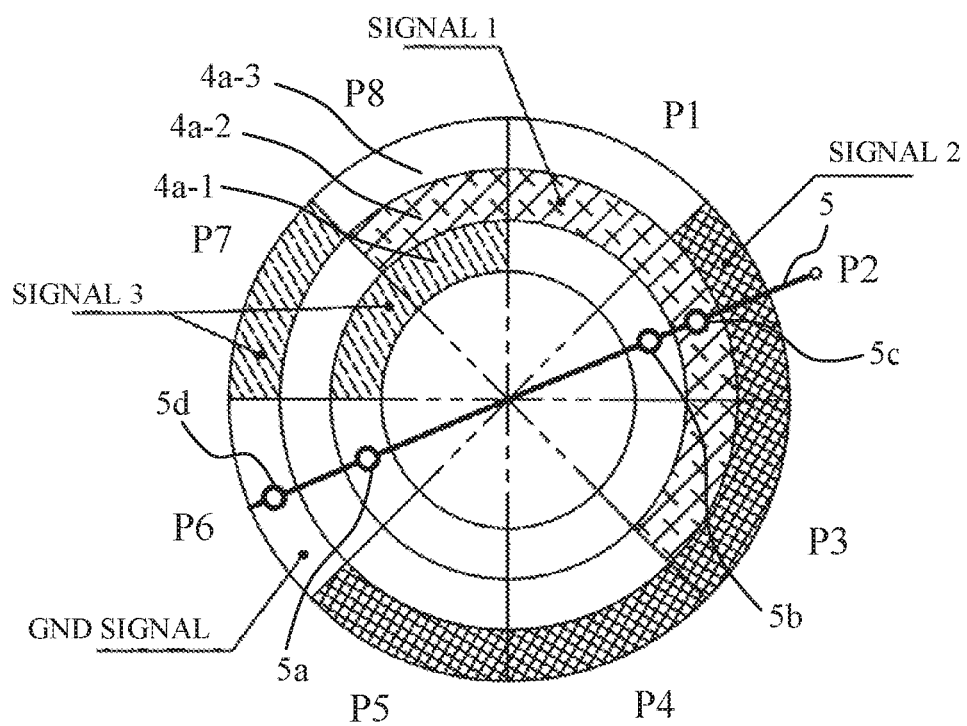
FIG. 5 is a schematic diagram of the flexible printed circuit board and the phase armature when the imaging mode P2 is selected.

FIG. 5 is a schematic diagram of the FPC 4 and the phase armature 5 when the imaging mode P2 is selected. In the state of FIG. 5, the contact portions 5a, 5b, and 5d are connected to the signal area of the GND signal and the contact portion 5c is connected to the signal area of the signal 1. Thereby, the potential of the signal 1 is LOW and the potentials of the signal 2 and the signal 3 are HIGH. Therefore, the binary code "011" is generated.

Figure 6:
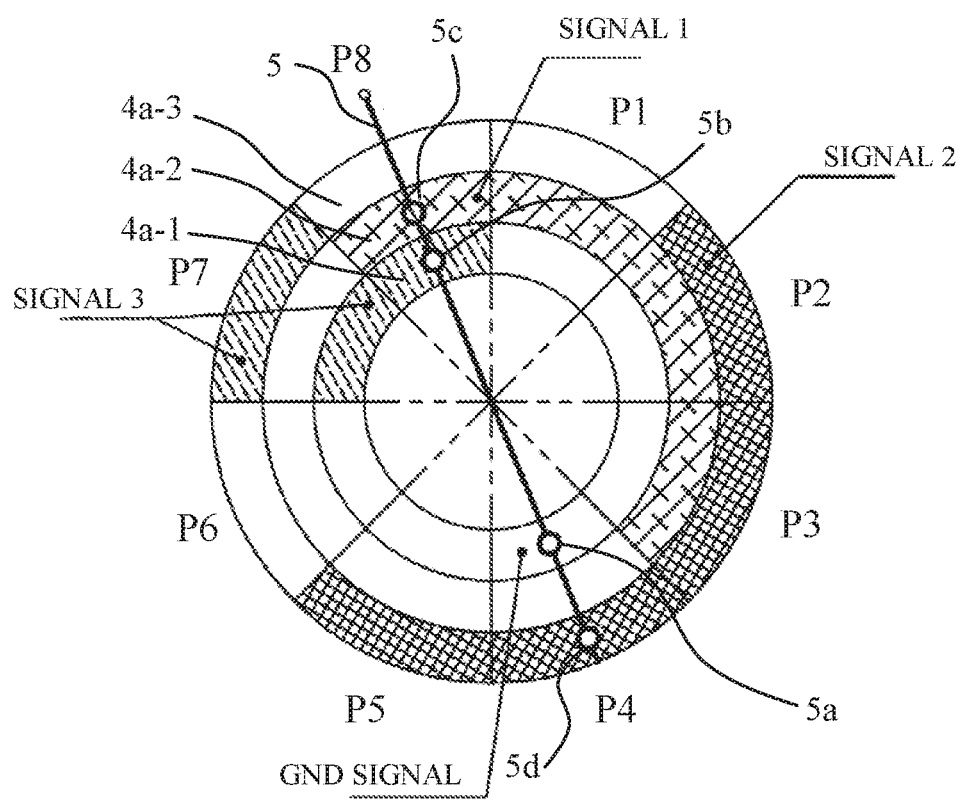
FIG. 6 is a schematic diagram of the flexible printed circuit board and the phase armature when the imaging mode P8 is selected.

FIG. 6 is a schematic diagram of the FPC 4 and the phase armature 5 when the imaging mode P8 is selected. In the state of FIG. 6, the contact portion 5a is connected to the signal area of the GND signal, the contact portion 5b is connected to the signal area of the signal 3, the contact portion 5c is connected to the signal area of the signal 1, and the contact portion 5d is connected to the signal area of the signal 2. Thereby, all of the signals 1-3 are connected to the GND signal and the potential is LOW. Therefore, the binary code "000" is generated.

This configuration can be achieved by satisfying the following two conditions:

Condition 1) The contact portions 5a and 5b are located on the same circle.

Condition 2) The predetermined signal pattern which the contact portions 5a and 5b contact must have a signal area of any one of the signals 1-3 and a signal area of the GND signal.

Both of the contact portions 5a and 5b will not be connected to the signal area of any one of the signals 1-3. Therefore, when one (the first contact portion) of the contact portions 5a and 5b is connected to the signal area of any one of the signals 1-3, the other (the second contact portion) is connected to the signal of the GND signal.

This embodiment provides the signal pattern 4a-1 to the innermost side, which is a signal pattern having the signal area of any one of the signals 1-3 and the signal area of the GND signal. Hence, this embodiment can provide a dial apparatus with a reduced sliding amount of the two contact portions 5a and 5b on the signal pattern, an excellent durability, and less scraping of the contact portion. Nevertheless, it is not always necessary to provide the signal pattern including the signal area of any one of the signals 1-3 and the signal area of the GND signal on the innermost circumference side and, for example, the signal pattern 4a-2 and the signal pattern 4a-3 may be used. It is necessary to provide a plurality of contact portions of the phase armature 5 corresponding to each signal pattern on the same circle. In this embodiment, the signal pattern 4a-1 has the signal area of the signal 3 and the signal area of the GND signal, but may have the signal area of the signal 1 or the signal 2 and the signal area of the GND signal.

FIG. 7 is an arrangement table of signal codes generated according to the connection state between the signal pattern 4a and the contact portions 5a-5d in each imaging mode. As illustrated in FIG. 7, in switching from a predetermined imaging mode to an adjacent imaging mode, only one signal of the signal 1-3 is always changed and a gray code is established. Therefore, erroneous signal data will not be generated in the transition of operating the mode dial 2 due to the mechanical accuracy of the dial apparatus and the data read timing. This also applies in switching from the imaging mode P8 to the imaging mode P1. This signal code arrangement table can freely exchange the signals 1-3, and the correspondence between the imaging mode and each signal code can be exchanged as long as a gray code is established.

As described above, the configuration of this embodiment can provide a dial apparatus that can generate a code in which all signal codes are "0," and detect $2^a$ phases with the "a" laps of signal patterns without increasing the signal patterns.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-229061, filed on Nov. 29, 2017, which is hereby incorporated by reference herein in its entirety.

What is claimed is:

1. A dial apparatus comprising:
   an operation member to be rotatably operated;
   a contact member including at least three contact portions and configured to rotate as the operation member rotates; and
   a substrate provided with a signal pattern provided on each of a plurality of concentric circles with a center at a rotation center of the operation member,
   wherein the dial apparatus outputs a binary code when each of the plurality of contact portions contacts each of the plurality of signal patterns as the operation member rotates,
   wherein the plurality of signal patterns includes a reference signal area connected to a reference potential, a first signal area configured to output a first signal, and a second signal area configured to output a second signal,
   wherein the plurality of signal patterns has a first signal pattern provided with the reference signal area and a second signal pattern provided with the first signal area,
   wherein the first signal pattern is provided with the second signal area in an area other than the reference signal area of the first signal pattern,
   wherein a first contact portion of the plurality of contact portions contacts the reference signal area of the first signal pattern provided with the second signal area,
   wherein a second contact portion of the plurality of contact portions contacts the reference signal area of the first signal pattern provided with the second signal area;
   wherein a third contact portion of the plurality of contact portions contacts the second signal pattern provided with the first signal area,
   wherein a contact of the first contact portion with the reference signal area of the first signal pattern and a contact of the second contact portion with the second signal area of the first signal pattern are simultaneously performed,
   wherein a contact of the second contact portion with the reference signal area of the first signal pattern and a contact of the first contact portion with the second signal area of the first signal pattern are simultaneously performed, and
   wherein a contact of the third contact portion with the second signal pattern and a contact of the first contact portion or the second contact portion with the reference signal area of the first signal pattern are simultaneously performed.

2. The dial apparatus according to claim 1, wherein the plurality of contact portions are provided on the same straight line that passes the rotation center.

3. The dial apparatus according to claim 1, wherein one or more of the plurality of contact portions are provided on both sides of the rotation center.

4. The dial apparatus according to claim 1, wherein the first signal pattern is located on the innermost side among the plurality of concentric circles.

5. The dial apparatus according to claim 1, wherein the binary code is a gray code.

6. The dial apparatus according to claim 1, wherein when one of the two contact portions contacts the first signal area, the other of the two contact portions contacts the reference signal area.

7. An imaging apparatus comprising the dial apparatus according to claim 1.

* * * * *